US008571471B2

(12) United States Patent
Kuenzi et al.

(10) Patent No.: US 8,571,471 B2
(45) Date of Patent: Oct. 29, 2013

(54) BATTERYLESS LOCK WITH TRUSTED TIME

(76) Inventors: Adam Kuenzi, Salem, OR (US); Ron Chapin, Gervais, OR (US)

( * ) Notice: Subject to any disclaimer, the term of this patent is extended or adjusted under 35 U.S.C. 154(b) by 236 days.

(21) Appl. No.: 13/092,565

(22) Filed: Apr. 22, 2011

(65) Prior Publication Data

US 2012/0270496 A1 Oct. 25, 2012

(51) Int. Cl.
*H04B 5/00* (2006.01)

(52) U.S. Cl.
USPC .................................... 455/41.1; 235/382.5

(58) Field of Classification Search
USPC ................ 455/411, 41.1, 41.2, 41.3; 340/5.8; 235/382.5
See application file for complete search history.

(56) References Cited

U.S. PATENT DOCUMENTS

| | | | | |
|---|---|---|---|---|
| 5,397,884 A * | 3/1995 | Saliga | ........................ | 235/382.5 |
| 6,680,877 B1 * | 1/2004 | Lienau | ........................ | 368/205 |
| 2007/0200665 A1 * | 8/2007 | Studerus | ........................ | 340/5.61 |
| 2008/0116746 A1 | 5/2008 | Hein | | |
| 2009/0207701 A1 * | 8/2009 | Jacques | ........................ | 368/205 |
| 2010/0073129 A1 * | 3/2010 | Pukari | ........................ | 340/5.8 |
| 2011/0035604 A1 * | 2/2011 | Habraken | ........................ | 713/193 |

FOREIGN PATENT DOCUMENTS

| | | |
|---|---|---|
| DE | 196 33 159 | 2/1998 |
| DE | 197 49 081 | 5/1999 |
| EP | 1 981 003 | 10/2008 |
| WO | 2006/098690 | 9/2006 |

OTHER PUBLICATIONS

Partial International Search Report for International Application No. PCT/US2012/034521 filed Apr. 20, 2012 (7 pages).

* cited by examiner

*Primary Examiner* — Ping Hsieh
(74) *Attorney, Agent, or Firm* — MH2 Technology Law Group LLP

(57) ABSTRACT

An electronic lock controller comprises a trusted time provider, a near field communication transceiver, and a logic processor. The trusted time provider provides a trusted time value. The near field communication transceiver receives power and a digital credential from an operator-side interface device. The logic processor produces an open or close command for an electromechanical lock based on the trusted time value and the digital credential. The electronic lock controller is powered solely by the near field communication transceiver.

26 Claims, 6 Drawing Sheets

BATTERYLESS LOCK WITH TRUSTED TIME

BACKGROUND

The present invention relates generally to wireless electromechanical locks, and more particularly to batteryless timekeeping for wireless electromechanical locks.

Electromechanical locks use a combination of electronic and mechanical components, typically including an electronic controller, a mechanical locking mechanism, and an electronic actuator capable of switching mechanical components between locked and unlocked states. Mechanical locking mechanisms may comprise, for instance, mechanical bolts and strikes. Some electronic actuators entirely open and close locks, such as by shifting a bolt. Other electronic actuators only release pins or catches so that an operator may open the lock. In either case, electronic actuators are controlled by electronic controllers, which respond to user inputs such as RFID information, passkeys, or other digital certificates. Controllers process and authenticate user inputs, and command electronic actuators to open or close accordingly. Electromechanical locks are conventionally powered with batteries, or by wired connection to a power grid.

Some electromechanical locks incorporate timekeepers such as real time clocks, enabling authentication procedures to depend on time. Such a lock might be configured, for instance, to allow the bearer of a particular digital certificate access into a restricted area only at certain times of day, or on certain days of each month. It is essential for such purposes that the electromechanical lock controller be provided with a trusted time, and not rely on operator-supplied or otherwise unsecured time values for certification.

Some electromechanical locks utilize near field communication (NFC) to communicate wirelessly with an operator. An operator-side interface device can inductively power the electromechanical lock for the duration of certification, thus allowing the lock to dispense with batteries and wired grid connections, reducing maintenance requirements and simplifying installation. Because NFC locks only receive power during intermittent interaction with an operator-side NFC initiator, however, a conventional continuous timekeeper such as a continuously active real time clock cannot be used. As a result, the prior art does not support trusted timekeeping for batteryless locks.

SUMMARY

The present invention is directed to an electronic lock controller with a trusted time provider, a near field communication transceiver, and a logic processor. The trusted time provider provides a trusted time value. The near field communication transceiver receives power and a digital credential from an operator-side interface device. The logic processor produces an open or close command for an electromechanical lock based on the trusted time value and the digital credential. The electronic lock controller is powered solely by the near field communication transceiver.

DETAILED DESCRIPTION

Figure 1:
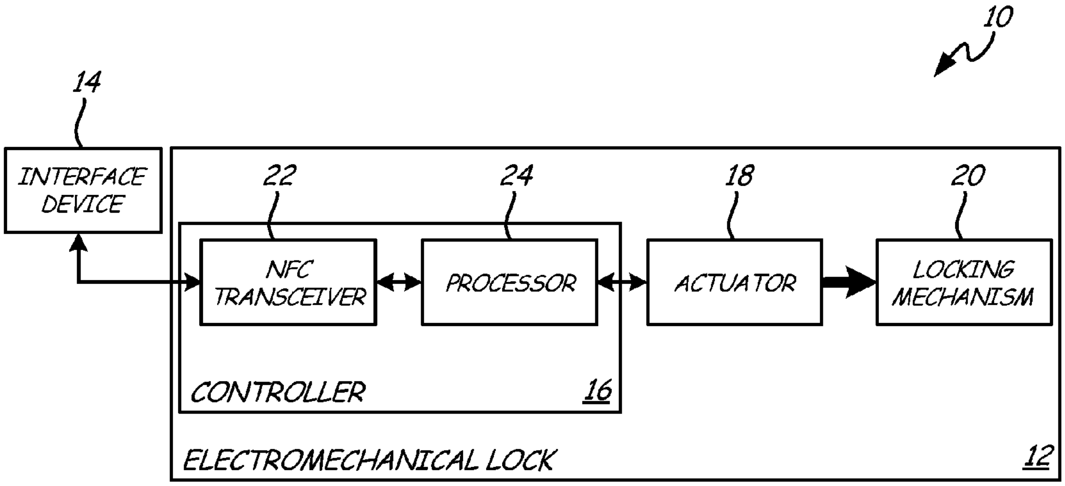
FIG. 1 is a block diagram of a wireless lock network of the present invention.

FIG. 1 depicts wireless lock network 10, comprising electromechanical lock 12 and interface device 14. Electromechanical lock 12 comprises controller 16, actuator 18, and locking mechanism 20. Controller 16 comprises NFC transceiver 22, processor 24, and a trusted time provider as described hereinafter.

Wireless lock network 10 includes devices in direct or indirect wireless communication with electromechanical lock 12. Electromechanical lock 12 is a NFC-capable lock having mechanical and electronic parts. Interface device 14 is an operator-side NFC-capable device for supplying a digital credential to electromechanical lock 12. Interface device 14 may be a dedicated lock controller, such as a NFC fob or remote, or a generic device such as a NFC-capable smartphone running appropriate software. To open electromechanical lock 12, an operator transmits a digital credential from interface device 14 to electromechanical lock 12. Electromechanical lock 12 is powered inductively by interface device 14, and includes no batteries or wired grid connection.

Interface device 14 inductively powers electromechanical lock 12 and communicates with processor 24 via NFC transceiver 22. Processor 24 validates a digital credential from interface device 14 in light of a trusted time, and commands actuator 18 to engage or disengage locking mechanism 20 accordingly. Locking mechanism 20 may be, for instance, a sliding bolt. To conserve power, actuator 18 may only set or release pins or catches of locking mechanism 20, enabling an operator to fully disengage or engage locking mechanism 20 manually.

Figure 2:
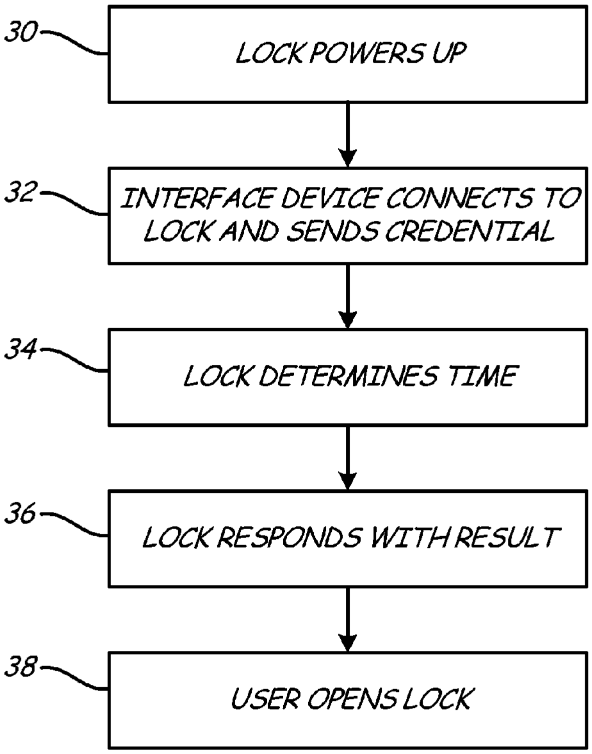
FIG. 2 is a flow chart of a certification method of the lock network of FIG. 1.

FIG. 2 is a flow chart of steps 30 through 38 of a certification method performed by lock network 10. First, electromechanical lock 12 powers up inductively with power supplied by a NFC connection to interface device 14 (Step 30). Once electromechanical lock 12 is powered, interface device 14 wirelessly connects to electromechanical lock 12 via NFC transceiver 22, and sends a digital credential to processor 24 (Step 32). This digital credential may comprise an ID tag identifying an operator, a date or time range specifying when the operator is certified to access a restricted area, and a pin code for authenticating the digital credential. Some data included in the digital credential, such as the pin code, are encrypted; other data, such as date or time ranges, need not be encrypted.

Processor 24 of electromechanical lock 12 determines the present time with an acceptable degree of accuracy using a trusted time acquisition method, as described hereinafter. (Step 34). Using this trusted time, the lock authenticates the digital credential and transmits a response to interface device 14 indicating whether or not the digital credential is accepted. (Step 36). A digital credential may be authorized to open electromechanical lock 12 only during certain times, or before a certain date, in which case the digital credential may be rejected if the trusted time falls outside of this authorized time period. If the credential is accepted, processor 24 commands actuator 18 to engage or disengage locking mechanism 20, unlocking and allowing the operator to open electromechanical lock 12. (Step 38).

Controller 16 runs on induced power from interface device 14, and does not rely on batteries or wired grid connections for power. Actuator 18 may also be powered by interface device 14. Controller 16 includes some means of acquiring a trusted time for use in authenticating a digital certificate, as disclosed hereinafter.

Figure 3:
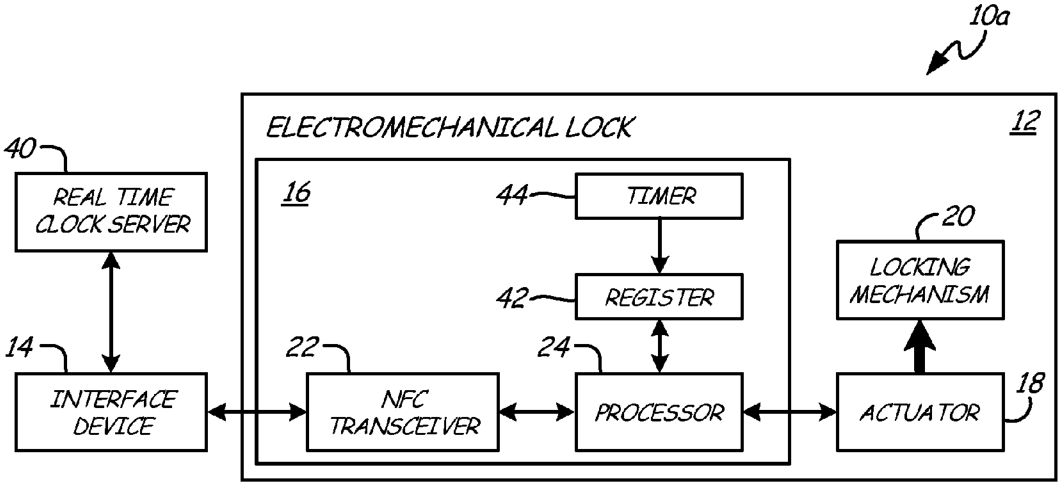
FIG. 3 is a block diagram of one embodiment of the lock network of FIG. 1.

FIGS. 3, 4, 5*a*, and 5*b* concern embodiments of a method for acquiring a trusted time. FIG. 3 depicts lock network 10*a*, an expanded version of lock network 10 comprising electromechanical lock 12, interface device 14, and real time clock server 40. Electromechanical lock 12 comprises controller 16, actuator 18, and locking mechanism 20, as discussed with respect to FIG. 1. Controller 16 comprises NFC transceiver 22, processor 24, and register 42, and in one embodiment further comprises timer 44. Register 42 is a memory register for storing a time value, and timer 44 is a low precision timer capable of running on minimal power for a limited duration.

Real time clock server 40 is a device comprising a real time clock and a wireless transceiver. Real time clock server 40 tracks the current time and is not directly accessible to the operator of electromechanical lock 12. Real time clock server 40 may be located locally or remotely from electromechanical lock 12. Real time clock server 40 may, for instance, be a web server, or a server at a remote broadcasting station or an artificial satellite. Alternatively, real time clock server 40 may be a local, low-power wireless device such as a fob carried by a user, or local wireless server in a region secured by electromechanical lock 12.

In one embodiment, real time clock server 40 provides a timestamped digital credential to interface device 14 periodically, or on demand. Each time stamped credential includes a digitally signed timestamp indicating the time (according to real time clock server 40) at which the credential was issued. Each credential may be valid only for a limited duration, or for a predetermined number of uses.

Figure 4:
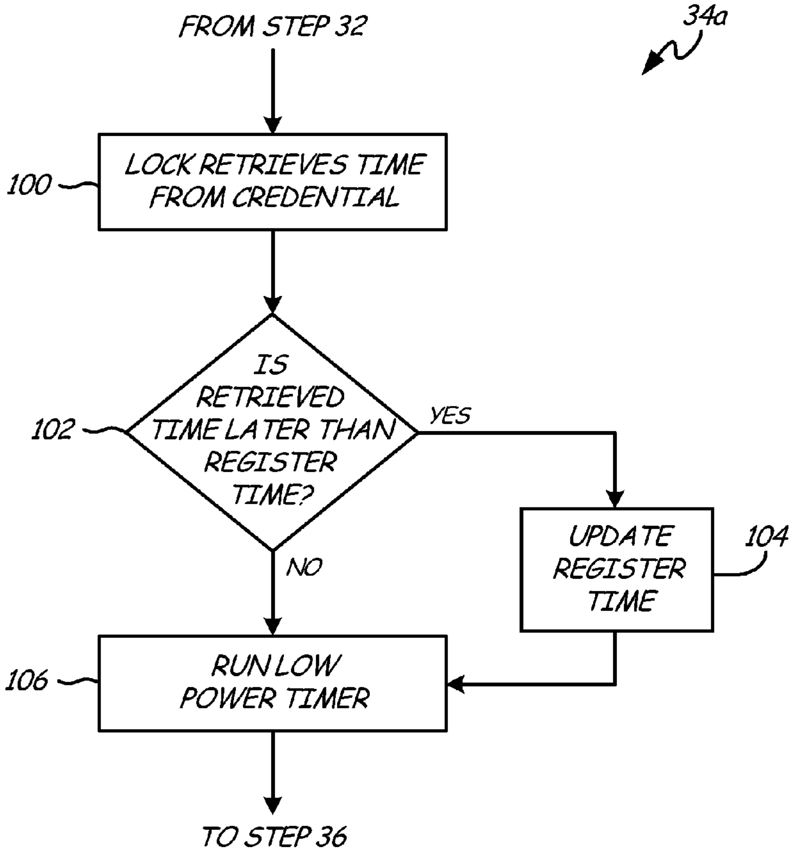
FIG. 4 is an expanded flow chart of one step of the method of FIG. 2, utilizing the lock network of FIG. 3.

FIG. 4 is a flow chart 34*a* of substeps of step 34 of FIG. 2, as performed by lock network 10*a*. Upon receiving a digital credential from interface device 14 (Step 32, FIG. 2), processor 24 of electromechanical lock 12 retrieves a time from the digital credential. (Step 100). Processor 24 then compares this retrieved time with a register time stored in register 42. (Step 102). If the retrieved time is later than the register time, the register time is replaced by the retrieved time. (Step 104). Thus, the register time stored in register 42 is a trusted "high water mark" time, which increases monotonically as operators interact with electromechanical lock 12. In this way, electromechanical lock 12 can reject credentials which are sufficiently older than the most up-to-date received credential. The more frequently operators interact with electromechanical lock 12, the more accurate this trusted "high water mark" time is likely to be, making this method particularly suitable to high traffic locks.

In one embodiment, low power timer 44 is energized inductively with each NFC interaction between electromechanical lock 12 and interface device 14. Low power timer 44 may be an extremely low power conventional timekeeper which draws on order 200 nA or less from a storage capacitor, or a decay timer which estimates time elapse based on charge decay of a storage capacitor. Low power timer 44 is used to periodically or continuously update the register time stored in register 42, thereby supplementing the "high water mark" method described above, and providing a more continuous and more accurate trusted time. Low power timer 44 can operate for several hours or days after charging inductively with NFC interaction between electromechanical lock 12 and interface device 14. Should low power timer 44 run out of energy and stop, register 42 will cease being updated until the next NFC interaction between electromechanical lock 12 and interface device 14, effectively reverting to the previously described embodiment without low power timer 44.

Figure 5A:
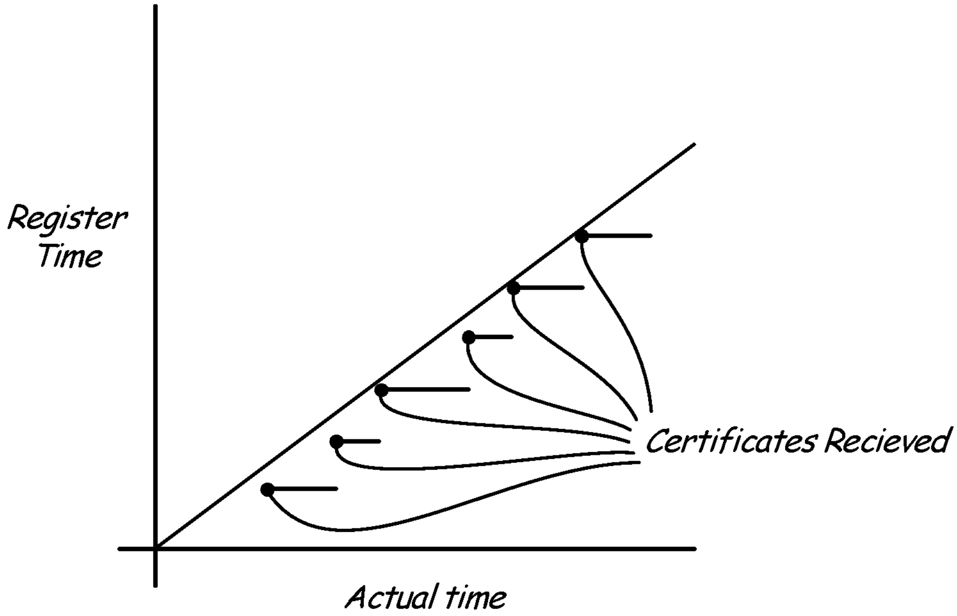
FIG. 5*a* is a plot of register time vs. actual time for the method of FIG. 4, without a timer.
Figure 5B:
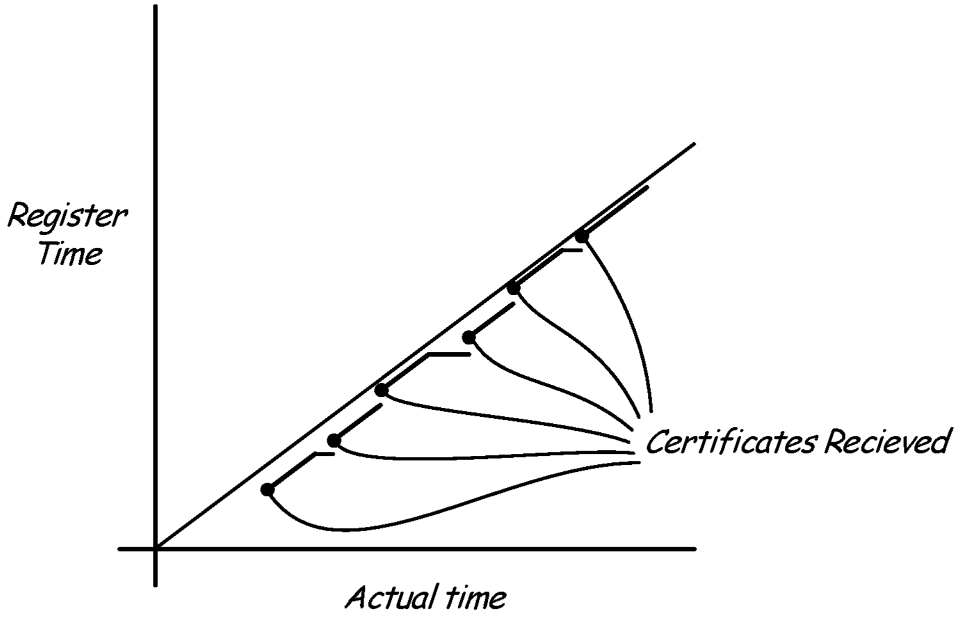
FIG. 5*b* is a plot of register time vs. actual time for the network of FIG. 3, with a timer.

FIGS. 5*a* and 5*b* are graphs of the time stored in register 42 versus actual time, indicating when certificates are received. FIG. 5*a* represents the embodiment without timer 44, and FIG. 5*b* represents the embodiment with timer 44. As previously discussed, the inclusion of timer 44 significantly improves the accuracy and continuousness of the time stored in register 42. Register time plateaus, however, when timer 44 exhausts stored power.

Figure 6:
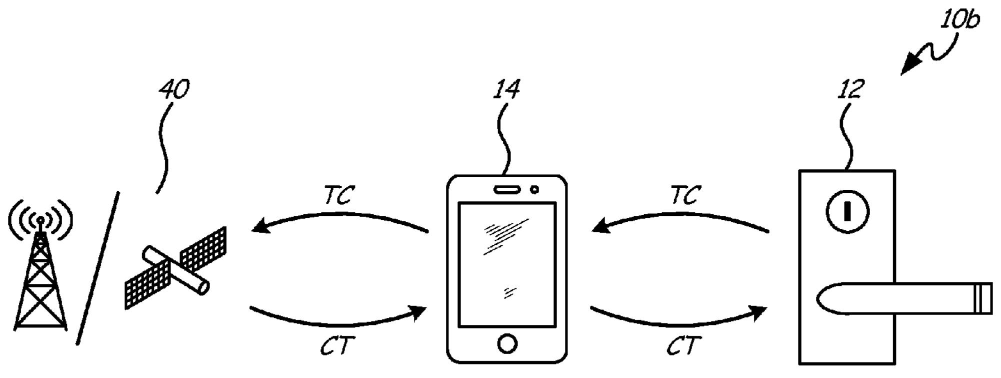
FIG. 6 is a symbolic view of another embodiment of the lock network of FIG. 1.

FIG. 6 is a symbolic view of lock network 10*b*, an alternative expanded version of lock network 10 comprising electromechanical lock 12, interface device 14, and real time clock server 40. As discussed previously with respect to FIG. 3, real time clock server 40 is a device comprising a real time clock and a wireless transceiver. In lock network 10*b*, real time clock server 40 need not provide interface device 14 with a time stamped digital credential. Instead, real time clock server 40 provides electromechanical lock 12 with a certified time value in real time, via interface device 14, during the authentication process.

Figure 7:
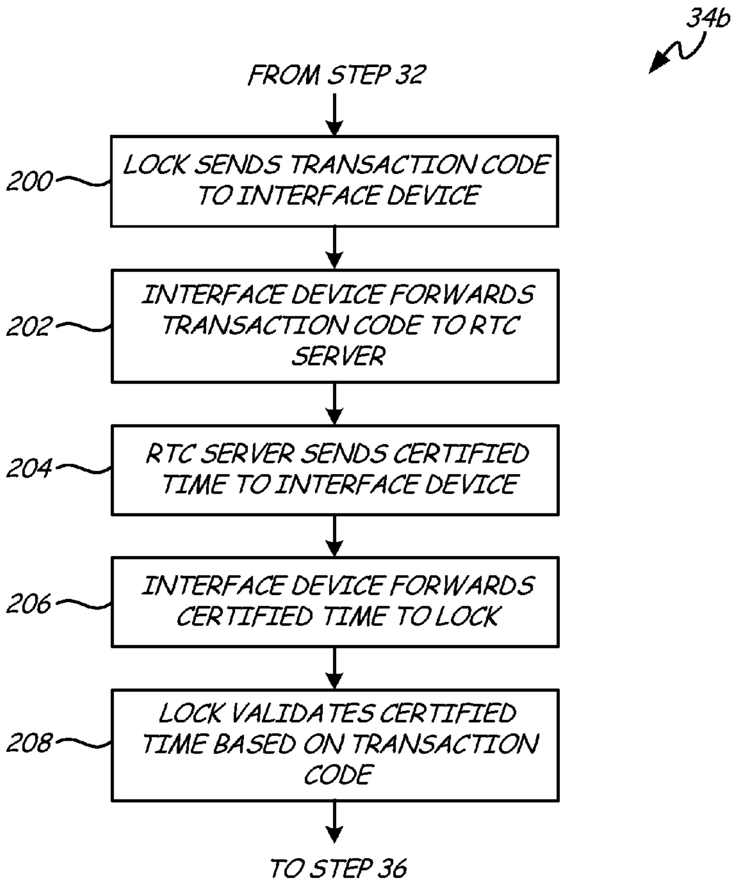
FIG. 7 is an expanded flow chart of one step of the method of FIG. 2, utilizing the lock network of FIG. 6.

FIG. 7 is a flow chart 34*b* of substeps of step 34 of FIG. 2, as performed by lock network 10*b*. Upon receiving a digital credential from interface device 14 (Step 32, FIG. 2), electromechanical lock 12 sends a transaction code TC to interface device 14 via NFC. (Step 200). Transaction code TC may be randomly generated or produced by incrementing a counter, and changes each time an interface device 14 initiates a new connection with electromechanical lock 12. Interface device 14 forwards transaction code TC to real time clock server 40. (Step 202). By transmitting transaction code TC to real time clock server 40 via interface device 14, rather than directly from electromechanical lock 12, the power requirements of electromechanical lock 12 are kept low, allowing electromechanical lock 12 to be run solely on induced power from interface device 14.

Real time clock server 40 produces a certified time CT in response to transaction code TC, and sends certified time CT to interface device 14. (Step 204). Certified time CT comprises a real time clock value and a validation certificate specific to transaction code TC. Interface device 14 forwards certified time CT to electromechanical lock 12 (Step 206), where processor 24 of electromechanical lock validates the certified time CT based on transaction code TC. If validation indicates that certified time CT is genuine, controller 16 of electromechanical lock 12 accepts certified time CT as a trusted time.

The embodiments of lock networks 10*a* and 10*b* may be combined. In one such combination, controller 16 checks the elapsed time on timer 44 (as described above with respect to FIGS. 3 and 4) upon being inductively powered by interface device 14. If the elapsed time on timer 44 exceeds a preset limit, controller 16 of electromechanical lock 12 requests a certified time from real time clock server 40 via interface device 14 (as described above with respect to FIGS. 6 and 7). This combined embodiment reduces traffic between interface device 14 and real time clock server 40 over the embodiment of lock network 10*b*, but retains reliable trusted time even after long periods of disuse of electromechanical lock 12, in comparison to the embodiment of lock network 10*a*.

Figure 8:
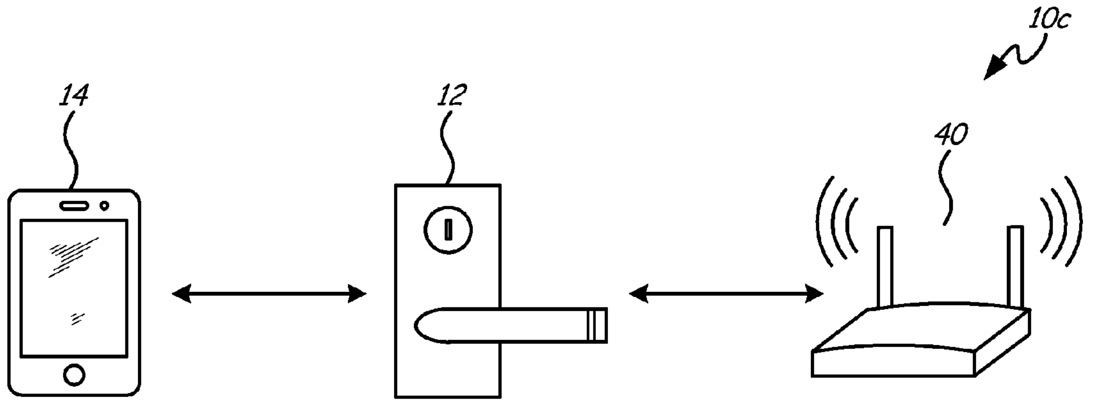
FIG. 8 is a symbolic view of a third embodiment of the lock network of FIG. 1.

FIG. 8 is a symbolic view of lock network 10*c*, an alternative expanded version of lock network 10 comprising electromechanical lock 12, interface device 14, and real time clock server 40. As discussed previously with respect to FIG. 3, real time clock server 40 is a device comprising a real time clock and a wireless transceiver. In the embodiment of lock network 10*c*, real time clock server 40 communicates directly with electromechanical lock 12. Because electromechanical lock 12 has no batteries or wired grid connection, it is essential that communication between real time clock server 40 and electromechanical lock 12 consume as little power as possible. Real time clock server 40 may accordingly be a local wireless device in a nearby secure area, such as in a region secured by electromechanical lock 12, or carried on the person of a user. Alternatively, real time clock server 40 may be a remote device such as a GPS satellite which continuously or regularly broadcasts a time signal for passive reception by electromechanical lock 12.

Figure 9:
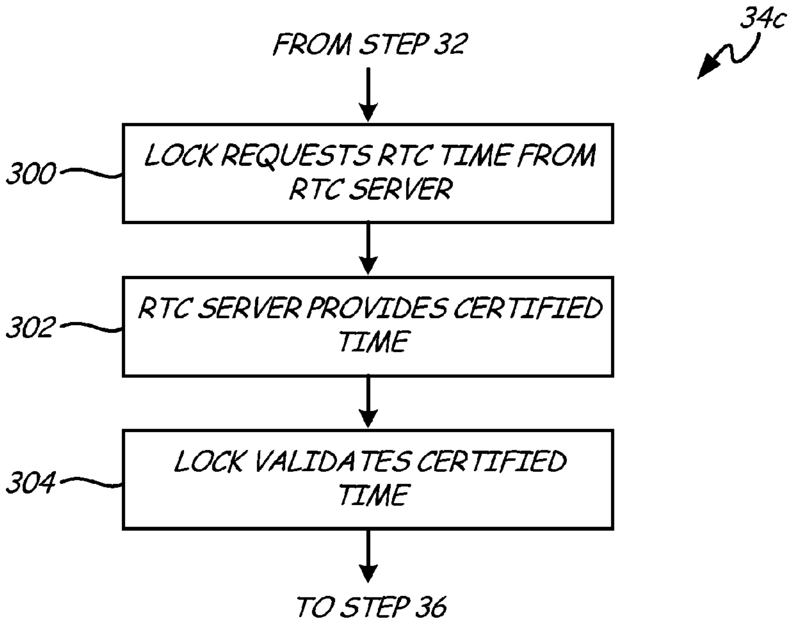
FIG. 9 is an expanded flow chart of one step of the method of FIG. 2, utilizing the lock network of FIG. 8.

FIG. 9 is a flow chart 34*c* of substeps of step 34 of FIG. 2, as performed by lock network 10*c*. Upon receiving a digital credential from interface device 14 (Step 28, FIG. 2), electromechanical lock 12 requests a certified time directly from real time clock server 40. (Step 300). Real time clock server 40 replies directly to electromechanical clock 12 with a certified time value (Step 302), which is validated by processor 24 of electromechanical lock 12. (Step 304). Electromechanical lock 12 may provide transaction code TC as in the embodiment of lock network 10*b*, or may use other methods to verify the authenticity of the certified time value.

The embodiments of lock networks 10*a* and 10*c* may be combined, much like the embodiments of lock networks 10*a* and 10*b*, and to substantially the same effect.

Figure 10:
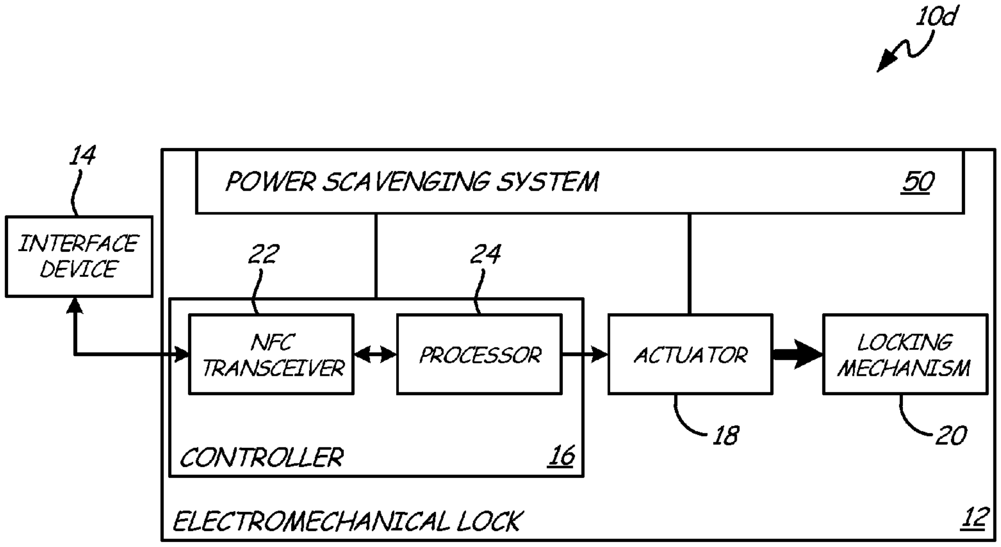
FIG. 10 is a block diagram of a fourth embodiment of the lock network of FIG. 1.

FIG. 10 depicts lock network 10*d*, an expanded version of lock network 10 comprising electromechanical lock 12 and interface device 14. Electromechanical lock 12 comprises controller 16, actuator 18, and locking mechanism 20, as discussed with respect to FIG. 1, and further comprises power scavenging system 50, a system capable of providing low power from the environment of electromechanical lock 12. Power scavenging system 50 may, for instance, comprise a solar panel, or a mechanical energy scavenging system which scavenges power from building resonance or movement of electromechanical lock 12. Power scavenging system 50 supplements power received inductively from interface device 14 via NFC. The embodiments of lock networks 10*a* and 10*d* may be combined to provide additional power for timer 44, increasing the time that timer 44 can run before depleting the limited power of electromechanical lock 12, or enabling timer 44 to be run continuously as an alternative to "high water mark" register updating. Embodiments of timer 44 with low enough power draw to run continuously are likely to be relatively inaccurate, but may be combined with occasional or periodic retrieval of certified times according to the embodiments of lock networks 10*b* or 10*c*, as discussed above, for improved accuracy. Alternatively or additionally, electromechanical lock 12 may be provided with an ambient light sensor, and increment a time counter by sensed day/night cycles.

Several methods have been presented for providing trusted time for electromechanical lock 12. In some embodiments, electromechanical lock 12 may be capable of performing a plurality of these methods. Electromechanical lock 12 may, for instance, select a method for providing trusted time according to availability of particular real time clock servers, on according to instructions from interface device 14. In one embodiment, the digital certificate transmitted by interface device 14 specifies a method for providing trusted time from among a list of methods electromechanical lock 12 is capable of performing.

Similarly, multiple real time clock servers 40 may be directly or indirectly available to electromechanical lock 12. Electromechanical lock 12 may select a real time clock server 40 based on circumstances such as signal strength, or based on outside instructions, such as instructions carried in the digital certificate transmitted from interface device 14.

The preceding methods for providing a trusted time require very little power expenditure, yet offer adequate long term accuracy. This low power draw enables electromechanical lock 12 is able to be powered by power scavenging system 50 and NFC power induction from interface device 14, alone, thereby avoiding the maintenance and replacement costs of batteries, and the installation challenges associated with wired grid connection.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electromechanical lock assembly, comprising:

a mechanical lock; and an actuator capable of locking and unlocking the mechanical lock; and an electronic lock controller for controlling the actuator, the lock controller comprising:

a trusted time provider for supplying a trusted time value;

a near field communication transceiver capable of communicating with and inductively receiving power from an operator-side interface device; and a logic processor capable of producing an open command for the actuator based on the trusted time value and a digital credential sent by an operator;

wherein— the electronic lock controller is primarily powered by the near field communication transceiver, and not by a battery or wired grid connection; and wherein— the digital credential is time-stamped and valid only during a bounded time window, and the operator receives the digital credential from a central server during the bounded time window, and the trusted time provider comprises a register which updates a date/time reference based on each digital credential received, thereby providing a trusted "high water mark" time which increases monotonically with each operator interaction with the electromechanical lock assembly.

2. The electromechanical lock assembly of claim 1, wherein the actuator is also powered by the near field communication transceiver.

3. The electromechanical lock assembly of claim 1, wherein the trusted time provider is a transceiver which receives a time reference from a real time clock server when powered by the operator-side interface device.

4. The electromechanical lock assembly of claim 1, further comprising an ambient light sensor, and wherein the trusted time provider increments a time or date value by counting day/night cycles with the ambient light sensor.

5. The electromechanical lock assembly of claim 1, further comprising an energy scavenging system, and wherein the trusted time provider is a low-power timekeeper powered by the energy scavenging system.

6. The electromechanical lock assembly of claim 5, wherein the energy scavenging system is a solar power cell.

7. The electromechanical lock assembly of claim 5, wherein the energy scavenging system is a mechanical energy scavenger which receives power from building resonance or movement of the electromechanical lock.

8. An electronic lock controller, comprising:

a trusted time provider capable of providing a trusted time value;

a near field communication transceiver capable of communicating with and inductively receiving power from an operator-side interface device; and a logic processor capable of producing an open command for an electromechanical lock based on the trusted time value and a digital credential sent by an operator;

wherein the lock controller is primarily powered by the near field communication transceiver, and not by a battery or wired grid connection; and wherein— the digital credential is time-stamped and valid only during a bounded time window, and the operator receives the digital credential from a central server during the bounded time window, and the trusted time provider comprises a register which updates a date/time reference based on each digital credential received, thereby providing a trusted "high water mark" time which increases monotonically with each operator interaction with the electromechanical lock controller.

9. The electronic lock controller of claim 8, wherein the trusted time provider is chosen from a plurality of trusted time provider options of which the electronic lock controller is capable.

10. The electronic lock controller of claim 8, wherein the trusted time provider is chosen according to instructions carried in the digital credential.

11. The electromechanical lock assembly of claim 8, wherein each digital credential is valid only for a predetermined number of uses, after which a new digital credential must be downloaded.

12. The electromechanical lock assembly of claim 11, wherein the predetermined number of uses is specified by the digital credential.

13. The electronic lock controller of claim 8, further comprising a low energy timer capable of running for a finite time period on power received from the near field communication transceiver; and wherein the trusted time is updated according to the time elapsed on the timer.

14. The electronic lock of claim 13, wherein the electronic lock controller requests a certified time via the interface device if a preset time has elapsed on the timer when the logic processor is powered by the near field communication transceiver.

15. The electronic lock controller of claim 8, further comprising an energy storage medium which gradually decays at a predictable rate once energized, and wherein the trusted time is updated with an elapsed time calculated from the rate and amount of decay of the energy storage medium.

16. A method for operating an electromechanical lock, the method comprising:

inductively powering the electromechanical lock from an operator-side near field communication capable interface device placed in proximity with the electromechanical lock;

connecting with and receiving a digital credential from the interface device;

determining a trusted time using power received from the interface device;

evaluating the digital credential in light of the trusted time, wherein the digital credential is time-stamped and valid only during a bounded time window, and the operator receives the digital credential from a central server during the bounded time window, engaging or disengaging the lock if evaluation of the digital credential indicates that the credential is valid; and updating a date/time reference in a register based on each digital credential received, thereby providing a trusted "high water mark" time which increases monotonically with each operator interaction with the electromechanical lock.

17. The method of claim 16, further comprising:

transmitting a transaction code to the interface device; and receiving a certified time code retrieved by the interface device from a real time clock server, the certified time code including a time value and a certificate dependent on the transaction code; and wherein determining the trusted time comprises evaluating the certified time code for authenticity to produce the trusted time.

18. The method of claim 17, wherein the real time clock server is located at a remote location such as a broadcasting station or an artificial satellite.

19. The method of claim 17, wherein the real time clock server comprises one of a local device in a secure area, a portable device carried by the user, or a web server.

20. The method of claim 17, wherein the interface device is a dedicated hardware device designed to operate with the electromechanical lock.

21. The method of claim 17, wherein the interface device is a multipurpose hardware device running dedicated software designed to operate the electromechanical lock.

22. The method of claim 17, wherein determining a trusted time comprises the electronic lock retrieving a time from a trusted time server using power received from the interface device.

23. The method of claim 22, wherein the trusted time server is a local device in a secure location or carried by a user.

24. The method of claim 22, wherein the trusted time server is a remote device such a satellite or web server.

25. The method of claim 16, wherein the trusted time is determined using a method specified by the digital credential.

26. The method of claim 16, wherein the trusted time is retrieved from a real time clock server designated by the digital credential.

* * * * *